Figure 1:
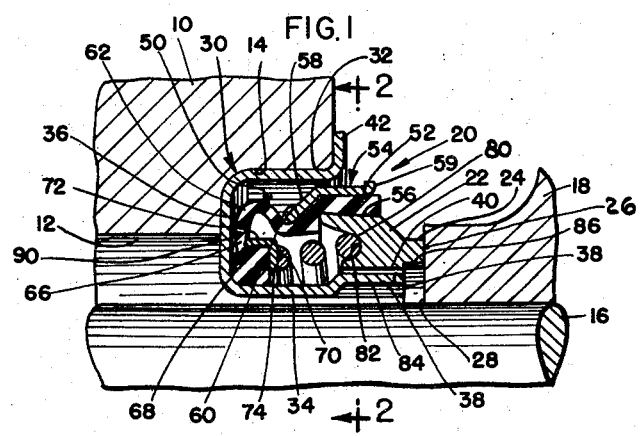

April 28, 1959     F. E. PAYNE     2,884,266
ROTARY MECHANICAL SEAL
Original Filed Sept. 20, 1954

INVENTOR:
FRANK E. PAYNE
BY
Edward R. Lowndes

United States Patent Office 2,884,266
Patented Apr. 28, 1959

2,884,266

ROTARY MECHANICAL SEAL

Frank E. Payne, Glencoe, Ill., assignor to Crane Packing Company, Chicago, Ill., a corporation of Illinois Original application September 20, 1954, Serial No. 457,194. Divided and this application August 18, 1955, Serial No. 529,204

1 Claim. (Cl. 286—11)

The present invention relates to improvements in shaft seals of the type shown and described in my copending application Serial No. 457,194, filed September 20, 1954, for Rotary Mechanical Seal, of which application the present application is a true division.

Specifically the invention relates to an improved rotary mechanical seal for effecting a seal against the passage of fluid between a shaft and a machine casing within which the shaft is rotatably mounted. The invention relates to that type of sealing device in which the sealing effect between the relatively moving parts occurs at radially extending surfaces and wherein a so-called running seal is effected between the moving parts.

Seals constructed in accordance with the principles of the present invention may assume various forms and, in the form illustrated herein, improved operating characteristics have been attained while at the same time ease of assembly of the seal has been facilitated.

In the assembly of seals of this type it is desirable that the installation be made with a minimum of effort so that the operator may devote but little time and thought to the assembly of the seal with which each pump is equipped. Such seals are a specialty and a more effective and proper assembly can be performed by the seal manufacturer at the factory than can be attained by individual installation so that thereafter the preassembled seals may be handled as complete "package-type" assemblies or units which are placed in position in the recess provided for them in the pump casing.

Briefly, seals of the type disclosed herein involve package-type units including a seal washer, bellows, spring and ferrule assembly, all designed for telescopic assembly upon one another wherein the sub-assembly of the washer, bellows and ferrule is held against removal by the application of an adhesive which is purported to hold the flanged end of the bellows in contact with the end wall of the retainer. The application of the adhesive is usually accomplished by a spraying operation.

The assembly of seals of this type in the manner briefly outlined above cannot be accomplished in a uniform manner and with uniform results inasmuch as the spraying operation is a manual one under the control of the operator who may apply too little or too much of the adhesive so that after the sub-assembly has been applied to the retainer different adhesive characteristics will obtain. It has been found that during normal assembly operations, seals of this type will withstand a tensile strength of approximately thirty pounds on the flange but occasionally where too little adhesive has been applied the parts will separate under a tensile pull of two or three pounds. Furthermore, the use of an adhesive for effecting the assembly requires a drying period of approximately sixteen hours which requires special handling and which thus considerably contributes to the overall cost of the seal.

The present invention in one form thereof is designed to overcome the above limitations that are attendant upon the assembly of seals of this character and toward this end it contemplates the provision of a novel form of clamping means whereby the inturned or flanged end of the elastomeric bellows may be preloaded upon the cylindrical wall of the retainer against dislodgement without the use of an adhesive.

In seals of this type undue external pressures developed on the outside of the sealing bellows may cause the bellows to enter the interstices between the various spring convolutions and, not only is the bellows subject to the pinching action of the spring, but such elongation or stretching of the bellows may pull the washer away from its seat, thus opening up the seal. It may also pull or strip the bellows flange away from the rear wall of the retainer.

According to the present invention means are provided for obviating this difficulty and, toward this end, provision is made whereby external pressures developed outside of the bellows may enter between the flanged end of the bellows and the end wall of the retainer so as to force the flexible portion of the bellows forwardly and counteract any tendency for the seal faces to open due to stretching of the bellows under the influence of external pressures. In carrying out this object, the invention contemplates the provision of a recess in the material of the bellows, the recess being formed by virtue of the provision of a void or recess in the inturned flanged end of the bellows on the rear side thereof so that pressure developed within this recess between the retainer wall and flanged end of the bellows will assist the action of the spring in maintaining the seal faces closed.

The provision of a rotary mechanical seal of the character briefly outlined above and possessing the advantages briefly set forth above being among the principal objects of the invention another object is to provide a seal of this character which is extremely compact in its design and which, although it employs a compression spring capable of a large degree of contractional and expansional movements, is relatively short with respect to its overall length thereby enabling the seal as a whole to be used in installations where space is at a premium.

Other important objects and advantages of the present invention will become more readily apparent as the nature of the invention is better understood.

In the accompanying single sheet of drawings forming a part of this specification a preferred embodiment of the invention has been shown.

Figure 2:
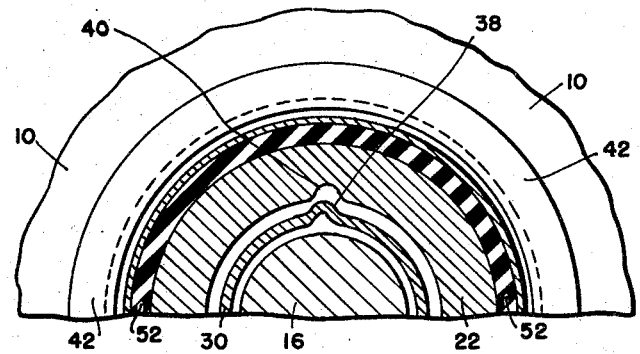

In these drawings:

Fig. 1 is a fragmentary quarter section view taken transversely through one form of seal assembly constructed in accordance with the principles of the present invention, and Fig. 2 is a sectional view taken substantially along the line 2—2 of Fig. 1.

Referring now to the drawings in detail, the seal assembly of the present invention has been shown as being applied to a pump construction which may be a high pressure jet pump including a pump housing 10 having an opening 12 formed therein provided with a counterbore 14. The pump shaft 16 extends through the opening 12 and carries the usual pump impeller 18. The seal assembly is designated in its entirety at 20 and includes a sealing washer 22 having a forwardly extending nose portion 24 on which there is formed a substantially flat annular radially disposed sealing surface 26 designed for running sealing engagement with a similarly flat sealing surface 28 provided on the hub portion of the impeller. The washer 22 may be formed of any of a number of known materials which have been proven effective as sealing elements as for example a molded thermo-setting resin having dispersed therein metal particles for better heat conductivity and good wear characteristics. The washer 22 is at least partially nested within a generally cylindrical cup-shaped retainer or shell 30 in the form of a light sheet metal stamping of one-piece construction having an outer cylindrical wall 32, an inner cylindrical wall 34, generally known as a "center post," and an interconnecting radial wall 36. The washer 22 is slidable upon the inner cylindrical wall 34 and a pair of diametrically opposed outwardly struck ribs 38 are formed on the wall 34 and extend into aligned longitudinal grooves 40 formed in the inner cylindrical bore of the washer 22. The ribs and grooves permit sliding movement of the washer on the cylindrical wall while preventing relative sliding movement between these parts.

The retainer 30 is pressed into the counterbore 14 of the housing 10 and an outwardly extending radial flange 42 formed on the retainer 30 serves to locate the latter with reference to the sealing surface 28 provided on the hub of the impeller 18.

In order to effectively seal the washer 22 with respect to the retainer 30 and consequently with respect to the housing 10, a flexible sleeve or bellows member 50 which is preferably formed of an elastomeric material such as rubber, either natural or synthetic, or a combination of the two, is provided with a forward thickened cylindrical region 52 which is telescopically received over the rear end of the washer 22 and which is clamped thereto by means of a generally cylindrical metal ferrule 54. The inside diameter of the ferrule 54 is somewhat less than the combined radial extent of the washer 22 and sleeve 50 so that the cylindrical portion 52 of the bellows may be preloaded upon the outer surface 56 of the washer. An inclined rearwardly extending flange 58 formed on the ferrule limits the forward axial movement of the ferrule during assembly operations when the washer 22, sleeve 50 and ferrule 54 are assembled one upon another. The forward end of the ferrule 54 is flared outwardly as at 59 to guide the ferrule over the thickened portion 52 of the sleeve during such assembly operations.

The sleeve or bellows 50 is provided with an outside conical surface 60, the slope of which is substantially the same as the slope of the conical portion 58 of the ferrule 54 and the thickened portion of the bellows merges with an intermediate flexible portion 62. The rear end of the bellows 50 is turned inwardly as at 66 to provide a flange portion, the inner edge of which terminates in a re-entrant thickened portion 68. In order that the seal shall function properly, it is necessary that the re-entrant thickened portion 68 of the bellows member 50 be held firmly against the inner face of the radial end wall 36 of the retainer 30 and, heretofore in seals of this general nature, adherence of the inturned flange of the bellows member has been effected by means of a suitable adhesive. In the present instance however this adherence is maintained by preloading the thickened portion 68 upon the retainer center post 34. Toward this end a metal band or ferrule 70 which is L-shaped in cross section has a cylindrical flange 72 which surrounds the thickened portion 68 and a radial flange 74 which bears against the forward face of the portion 68. The diameter of the ferrule is such that when the same is in position over the thickened portion 68, the latter is compressed between the cylindrical wall 72 of the ferrule and the cylindrical wall 34 of the retainer thus compressing the thickened portion on the latter cylindrical wall. A coil spring 80 which may be of slight conical configuration bears at one end against the radial flange 74 of the ferrule 70 and the other end of the spring is seated within a recess 82 provided in the rear face of the washer 22. The recess 82 is comparatively deep and allows the use of a spring 80 which is comparatively long and which therefore has an effective sealing action on the washer 22. The fact that the recess 82 in the washer is relatively deep and also the fact that the spring 80 is of conical configuration mutually contributes toward the provision of a seal assembly which may be constructed with an overall length which is considerably shorter than would otherwise be possible.

The central opening provided in the ring member 70 is of a diameter sufficiently great to enable the ring member to pass over the driving ribs 38 on the center post 34 during initial assembly operations.

The bellows member 50 is molded so as to provide a slight clearance as shown at 90 on the rear side of the bellows between the radial retainer wall 36 and bellows, this clearance being provided for the purpose of establishing a hydraulic balance on the opposite sides of the bellows. In Fig. 1 the seal is shown in its installed position with the bellows shown in the position it will assume before any fluid pressure is applied exteriorly thereof. While the exact shape that the bellows will assume when pressure is exerted upon it from the outside cannot be ascertained, it is known of course that such pressure will tend to collapse the bellows inwardly to a certain extent depending upon the amount of pressure in the fluid to be sealed. Without the provision of the recess 90 it may be observed that any tendency for the bellows to collapse will blow the bellows, so to speak, inwardly so that it will hug the convolutions of the spring 80 thus stretching the bellows and when the pressure is sufficiently high, this stretching of the bellows may have the effect of opening up the two seal surfaces 26 and 28 by virtue of the washer 22 being drawn rearwardly under the stretching action of the bellows. Where the recess 90 is provided however a hydraulic balance is obtained whereby fluid pressure may pass around the rear end of the bellows and move the same forwardly thus effectively increasing the length of the flexible portion of the bellows so that upon inward movement thereof ample material is supplied and there will be no tendency for the material to stretch and pull the washer 22 away from the seat 18. This clearance 90 at the rear end of the bellows constitutes one of the important features of the present invention.

The provision of the clearance space or recess 90 which permits external pressures developed outside of the bellows to pass behind the bellows and assist in moving the same forwardly is especially important for seals which contemplate high external pressures. With seals designed for use in accommodating high internal pressures the recess 90 may be omitted and the clamping band or ferrule 70 will still effectively serve its function of preventing pulling of the inturned flange radially outwardly or forwardly and away from the rear wall 36 of the retainer or shell 30.

In compliance with Title 35, U.S. Code, Section 22, a preferred form of the invention has been shown in the drawings and described herein, but it should be understood that the invention is not limited to the specific disclosure made, and that the appended claim should be construed as broadly as the prior art will permit.

What I claim is:

A seal for relatively rotatable elements comprising in combination a washer having a radially outer surface, a deep annular recess in the rear face thereof extending into the radial confines of the outer surface, a deformable sleeve of elastomeric material, said sleeve having a radially disposed, inwardly extending flange at one end, the other end thereof being telescoped over the said outer surface of the washer and the region intermediate the ends being deformable to accommodate relative axial movement between the ends of the sleeve, means for compressing the telescoping end of the sleeve against the outer surface of the washer to form a fluid-tight connection therebetween, a retainer having a cylindrical portion and a radial wall disposed rearwardly of said washer and against which at least a portion of said radially disposed flange bears, said inwardly extending flange having an enlarged re-entrant portion immediately surrounding the cylindrical wall of the retainer and extending axially toward the washer, a ring disposed within said sleeve and having a portion surrounding said re-entrant portion and serving to compress the latter upon the cylindrical portion of the retainer, and a compresison spring having one end disposed in the annular recess in the water and its other end bearing against the ring within the sleeve, the axial extent of the flange being substantially equal to the axial depth of the recess to avoid unduly lengthening the seal axially by virtue of the presence of the said flange.

References Cited in the file of this patent

UNITED STATES PATENTS

| | | |
|---|---|---|
| Re. 23,898 | Haake | Nov. 23, 1954 |
| 2,467,543 | Voytech | Apr. 19, 1949 |
| 2,610,075 | Haake | Sept. 9, 1952 |
| 2,671,407 | Higbie | Mar. 9, 1954 |
| 2,815,967 | Payne et al. | Dec. 10, 1957 |